United States Patent
Dunne

(10) Patent No.: US 10,393,517 B2
(45) Date of Patent: Aug. 27, 2019

(54) LASER SOURCE MODIFICATION TECHNIQUES FOR A LASER-BASED RANGEFINDING OR SPEED MEASUREMENT INSTRUMENT ENABLING INCREASED RANGE WITH IMPROVED ACCURACY

(71) Applicants: Laser Technology, Inc., Centennial, CO (US); Kama-Tech (Hk) Limited, Tsim Sha Tsui (CN)

(72) Inventor: Jeremy G. Dunne, Parker, CO (US)

(73) Assignees: Laser Technology, Inc., Centennial, CO (US); Kama-Tech (HK) Limited, Hong Kong (CN)

(*) Notice: Subject to any disclaimer, the term of this patent is extended or adjusted under 35 U.S.C. 154(b) by 553 days.

(21) Appl. No.: 14/525,014

(22) Filed: Oct. 27, 2014

(65) Prior Publication Data
US 2016/0116278 A1    Apr. 28, 2016

(51) Int. Cl.
*G01C 3/02* (2006.01)

(52) U.S. Cl.
CPC ........................ *G01C 3/02* (2013.01)

(58) Field of Classification Search
CPC ......... G01C 3/08; G01S 17/105; G01S 17/42; G01S 7/4863; G01S 17/936
See application file for complete search history.

(56) References Cited

U.S. PATENT DOCUMENTS

| | | | |
|---|---|---|---|
| 5,574,552 A | 11/1996 | Dunne | |
| 5,612,779 A | 3/1997 | Dunne | |
| 5,652,651 A | 7/1997 | Dunne | |
| 5,703,678 A | 12/1997 | Dunne | |
| 5,880,821 A | 3/1999 | Dunne | |
| 5,926,260 A | 7/1999 | Dunne et al. | |
| 5,999,281 A * | 12/1999 | Abbott | G03B 21/62 156/166 |
| 6,057,910 A | 5/2000 | Dunne | |
| 6,226,077 B1 | 5/2001 | Dunne | |
| 6,445,444 B2 | 9/2002 | Dunne | |
| 6,545,764 B1 * | 4/2003 | Laczik | G01B 11/30 356/388 |
| 9,869,442 B2 * | 1/2018 | Bhakta | G03B 21/204 |
| 2002/0097587 A1 | 7/2002 | Krietzman | |
| 2002/0135831 A1 | 9/2002 | Park | |
| 2008/0029486 A1 | 2/2008 | Bastawros et al. | |

(Continued)

FOREIGN PATENT DOCUMENTS

| | | |
|---|---|---|
| DE | 2101772 | 8/1971 |
| DE | 10218910 A1 | 11/2003 |
| DE | 102011000978 | 8/2012 |

OTHER PUBLICATIONS

Quimby, R.S., "Photonics and Lasers: An Introduction", Apr. 2006, pp. 195-207.

(Continued)

*Primary Examiner* — Luke D Ratcliffe
(74) *Attorney, Agent, or Firm* — William J. Kubida; Hogan Lovells US LLP

(57) ABSTRACT

Laser source modification techniques for a laser-based rangefinding or speed measurement instrument enabling increased range, better defined beam pattern and improved accuracy through the use of diffusers and/or spatial filters while still remaining within applicable Class 1 eye-safety limits.

4 Claims, 4 Drawing Sheets

(56) References Cited

U.S. PATENT DOCUMENTS

| | | |
|---|---|---|
| 2012/0097741 A1 | 4/2012 | Karcher |
| 2012/0287417 A1* | 11/2012 | Mimeault ................ G01C 3/08 |
| | | 356/5.01 |
| 2013/0229644 A1* | 9/2013 | Chung .................... G01S 17/88 |
| | | 356/5.01 |
| 2014/0051967 A1 | 2/2014 | Irisawa |
| 2014/0071432 A1 | 3/2014 | Dunne |

OTHER PUBLICATIONS

PCT International Search Report and Written Opinion for International Application No. PCT/US15/54162, dated Feb. 2, 2016, 12 pages.
International Preliminary Report on Patentability for PCT/US2015/054162, dated May 11, 2017, 10 pages.
Extended European Search Report dated May 24, 2018 in related EP Application No. EP15854973.3.
Luminit: "Holographic Light Shaping Diffusers," May 21, 2012, http://www.luminitco.com/sites/default/files/LSD_Tech_Datasht_5_21_12_lo_0.pdf.

* cited by examiner

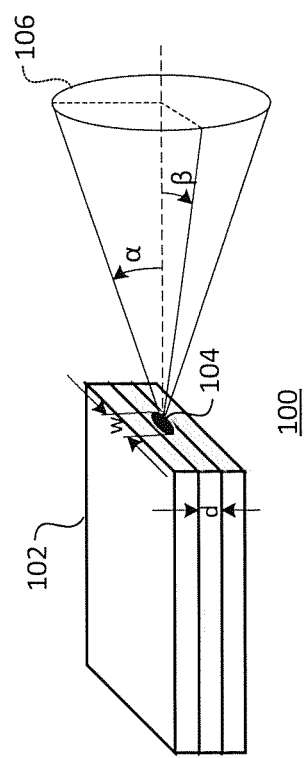
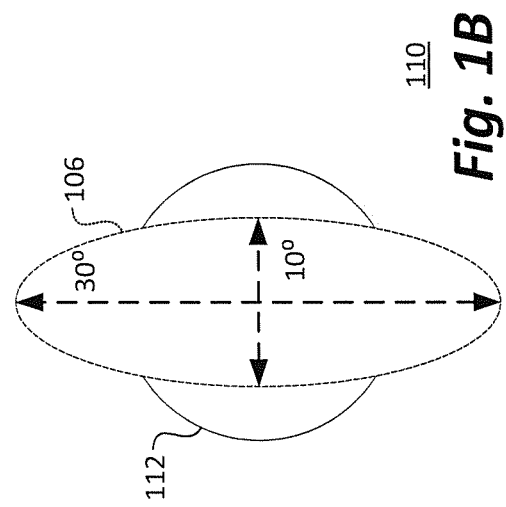
Fig. 1A
Fig. 1B

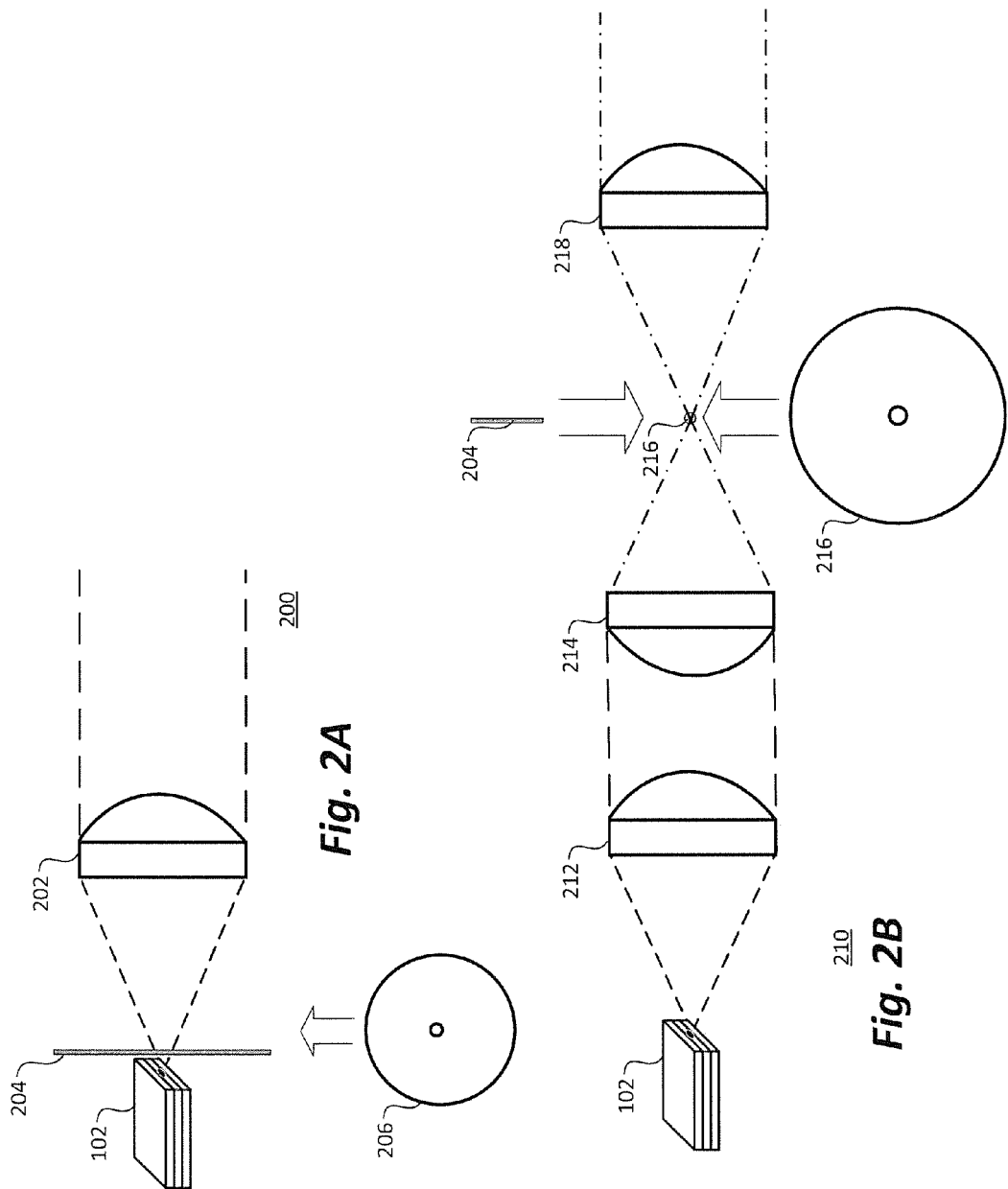

LASER SOURCE MODIFICATION TECHNIQUES FOR A LASER-BASED RANGEFINDING OR SPEED MEASUREMENT INSTRUMENT ENABLING INCREASED RANGE WITH IMPROVED ACCURACY

BACKGROUND OF THE INVENTION

The present invention relates, in general, to the field of laser rangefinding and speed measurement instruments. More particularly, the present invention relates to laser source modification techniques for a laser-based rangefinding or speed measurement instrument enabling increased range, better defined beam pattern and improved accuracy while remaining within applicable eye-safety limits.

Laser rangefinders, such as those designed and produced by Laser Technology, Inc., Centennial, Colo., assignee of the present invention, operate to calculate distance by measuring the time of flight of very short pulses of infrared light. That is, a measurement is made as to the time it takes one or more laser pulses to travel to a target and back with a precision time base. With knowledge of the constant speed of light, the distance the laser pulses have traveled can then be calculated.

In order to increase accuracy, such laser rangefinders are designed to process multiple pulses in a single measurement period, with target acquisition times typically ranging from 0.3 to 0.7 seconds. Sophisticated accuracy validation algorithms are then utilized to ensure reliable distance measurements and eliminate spurious signals due to noise and other factors.

Laser Technology, Inc. has pioneered and developed the design and measurement functionality found in some of the most popular lines of rangefinders and speed measurement instruments currently available on the market. Representative of its proprietary technology is that disclosed in U.S. Pat. Nos. 5,574,552; 5,612,779; 5,652,651; 5,703,678; 5,880,821; 5,926,260; 6,057,910; 6,226,077 and 6,445,444, the disclosures of which are herein specifically incorporated by this reference in their entirety.

Laser-based speed and rangefinding instruments have to adhere to strict eye-safety standards and consumer devices in particular have to adhere to U.S. Food and Drug Administration Title 21 and International Electrotechnical Commission (IEC) 60825 Class 1 standards. These regulations define a 514 nanojoules per pulse energy maximum. In reality, this figure must then be further reduced and divided by the fourth root of the number of pulses emitted in the applicable time base, which is typically just over ten seconds, thereby reducing the number further.

In addition to this are the inevitable correction factors which must be accounted for such as $\alpha_{min}$ (alpha min; the angular subtense of a source below which the source can be effectively considered as a point source), beam exit size and the like. All these factors go into a determination of the limit of the nanojoules per pulse that are allowed in order for the instrument to remain within the applicable Class 1 limits.

High power pulsed laser diodes (PLDs) for rangefinding, speed monitoring and other applications are available, for example, at wavelengths of 905 nm. At 905 nm, the Class 1 limit is what is measured at the output of the instrument and not what the PLD itself can put out, which can be greater than the Class 1 eye-safety limit.

Rangefinding instruments may also be based on those PLDs having a wavelength centered at 1550 nm and they can be operated at high power levels while still remaining in an eye-safe range. At 1550 nm, the PLDs are more expensive than those at 905 nm (and only about $\frac{1}{3}^{rd}$ as efficient) and not enough energy can be output to reach the Class 1 limit with currently available diodes. As they are inherently eye-safe, more energy can be output, resulting in increased range, if the source can emit the requisite energy. Most common night-vision googles cannot detect this wavelength and they are often employed in military rangefinding instruments.

SUMMARY OF THE INVENTION

Disclosed herein are laser diode source modification techniques for laser-based rangefinding or speed measurement instruments enabling increased range, better defined beam pattern and improved accuracy using either 905 nm, 1550 nm or other laser diode sources while still remaining within the applicable Class 1 eye-safety limits.

Particularly disclosed herein is a rangefinding or speed measurement instrument having a laser light transmission section which comprises a laser diode, an exit aperture for directing laser energy from the laser diode toward a target and a diffuser interposed between the laser diode and the exit aperture.

Also particularly disclosed herein is a rangefinding or speed measurement instrument having a laser light transmission section which comprises a laser diode emitting an asymmetric beam pattern, an exit aperture for directing the laser light from the laser diode toward a target and an elliptical diffuser proximate the laser diode and interposed between the laser diode and the exit aperture.

Further particularly disclosed herein is a rangefinding or speed measurement instrument having a laser light transmission section which comprises a laser diode, an exit aperture for directing the laser light from the laser diode toward a target and a spatial filter interposed between the laser diode and the exit aperture. The spatial filter may comprise one or more plano-convex, cylinder or other lenses and an associated pinhole.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 1A is a simplified representation of a laser diode indicative of the device active region width (w) and thickness (d) and resultant asymmetrical beam pattern emitted;

FIG. 1B is another view of the asymmetrical beam pattern of the preceding figure superimposed on the exit aperture of a laser rangefinding and speed measurement instrument;

FIG. 2A is a simplified representation of a modified laser source according to a particular embodiment of the present invention comprising a plano-convex lens for collimating the output of a laser diode in conjunction with a diffuser located proximate the laser diode;

FIG. 2B is a further simplified representation of a modified laser source according to another particular embodiment of the present invention comprising a pair of opposing plano-convex lenses for focusing the output of a laser diode through a pin-hole and further collimation through a third plano-convex lens;

DESCRIPTION OF A REPRESENTATIVE EMBODIMENT

Figure 3:
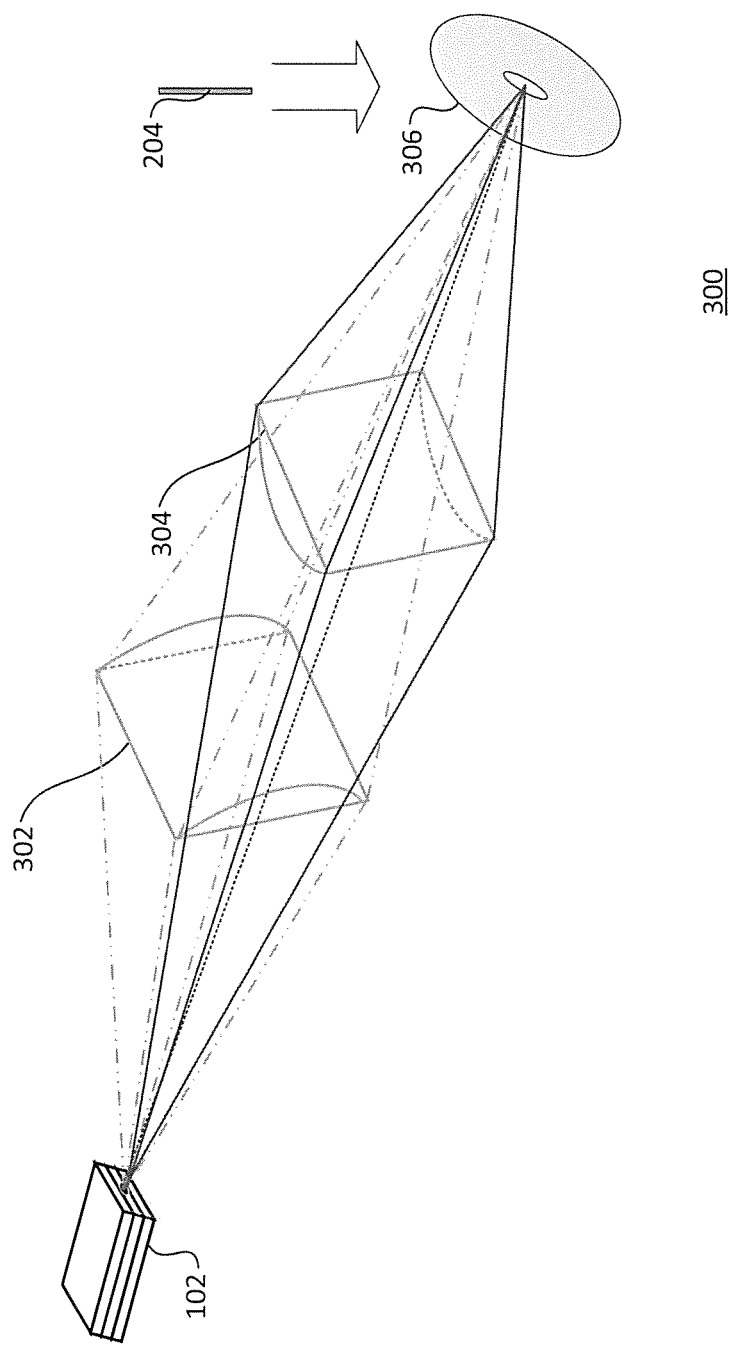
FIG. 3 is an additional simplified representation of a modified laser source according to a further particular embodiment of the present invention comprising a pair of opposing cylinder lenses for focusing the output of a laser diode through a pinhole.

With reference now to FIG. 1A, a simplified representation 100 of a laser diode 102 is illustrated indicative of the device stripe, or active region, 104 width (w) and thickness (d) and the resultant asymmetrical output beam 106 pattern emitted. The half angular spread of the output beam 106 perpendicular (or normal) to the active region 104 layer is indicated as the angle α, and is typically 15°. Similarly, the half angular spread of the output beam in the plane of the active region 104 is indicated as the angle β, and is typically 5°.

As indicated in Quimby, R. S., "*Photonics and Lasers: An Introduction*", April 2006, the disclosure of which is herein specifically incorporated by this reference in its entirety, since the active region 104 thickness of a conventional laser diode is generally less than its width, (i.e. d<w) the angular distribution of the output beam 106 is asymmetrical with greater spreading in the direction perpendicular to the layers of the laser diode 102. As a consequence, it is noted in Quimby that special aspherical lenses may be required to circularize the output beam 106.

With reference additionally now to FIG. 1B, another view 110 of the asymmetrical beam 106 pattern of the preceding figure is shown superimposed on the objective lens of the exit aperture 112 of a laser rangefinding or speed measurement instrument. As illustrated, the asymmetrical beam 106 overfills the objective lens at the exit aperture 112 in the direction normal to the active region 104 (FIG. 1A) and under-fills it in the plane of the active region 104. A typical laser diode 102 (e.g. a 905 nm) asymmetrical beam 106 pattern of 10° by 30° is illustrated.

The Class 1 limits mentioned previously also specify a 7 mm rule (unaided eye viewing) and a full aperture rule, the latter being met by the expansion of the emitted laser beam to the full aperture such that the power density of the transmitted beam is reduced below the applicable eye-safety limit. The maximum permissible exposure (MPE) for a pulsed laser beam is based on the peak power of the pulse.

In operation, it is desirable to have the output beam 106 fill the exit aperture 112 but if the entire energy output of the laser diode 102 is concentrated in an ellipse within the exit aperture 112 (as opposed to the situation illustrated in FIG. 1B), the energy density would be too high at 905 nm for the Class 1 limit. At 905 nm the laser diode can output more energy than the Class 1 eye-safety limit.

Therefore, while it is desirable to fill the exit aperture 112, filling it by increasing the energy output of the laser diode 102 to expand the asymmetrical beam 106 in the plane of the active region 104 effectively reduces the lifetime of the device while inefficiently providing only on the order of 30% of the total energy at the exit aperture. In any event, such a technique is not appropriate at 1550 nm where all available output energy from the laser diode 102 is required.

With reference additionally now to FIG. 2A, a simplified representation of a modified laser source 200 according to a particular embodiment of the present invention is illustrated comprising a plano-convex lens 202 for collimating the output of a laser diode 102 in conjunction with a diffuser 204, which may comprise a holographic diffuser, located proximate the laser diode 102. It should be noted that the plano-convex lens 202 illustrated is only representative and that aspheric or compound lenses may be substituted therefor.

Holographic diffuser 204 effectively shapes and distributes the light output of a laser diode into a defined cone angle which can be either circular (i.e. symmetrical) or elliptical (i.e. asymmetrical) through the random, non-periodic structures formed on its surface. With respect to diffuser 204, it should be oriented such that its elliptical pattern is orthogonal to the pattern of the asymmetrical beam 106 (FIG. 1B) with a view toward reducing its asymmetrical pattern towards one that is effectively more circular. As also illustrated, an optional pinhole 206 may be utilized in conjunction with the diffuser 204 as indicated.

With reference additionally now to FIG. 2B, a further simplified representation of a modified laser source 210 according to another particular embodiment of the present invention is illustrated comprising a pair of opposing plano-convex lenses 212, 214 for focusing the output of a laser diode 102 through a pinhole 216 and further collimation through a third plano-convex lens 218. In order to remain in compliance with Class 1 eye-safety limits, it should be noted that in conjunction with 905 nm laser diodes 102 a diffuser 204 is suggested in association with pinhole 216 while in conjunction with 1550 nm laser diodes 102 a diffuser 204 is not necessary. Again, it should be noted that the plano-convex lenses 212, 214 and 218 illustrated are only representative and that aspheric or compound lenses may be substituted therefor.

The beam converging lenses 212, 214 in conjunction with the pinhole 216 comprise a spatial filter which functions to remove interference patterns in the laser optical system. In operation, the spatial filter allows the focused beam to pass through the pinhole 216 with any interference being advantageously attenuated. Selection of the optimum pinhole diameter is dependent on the laser light wavelength, the laser beam diameter and the focal length of the optical system.

If the source of laser energy is re-imaged, (the image of the source on the diffuser effectively becomes the new source) then the source can be made effectively circular so the far field pattern at infinite collimation is also effectively circular. Such a result is particularly desirable in speed enforcement applications where it must be known what part of the vehicle the beam is hitting together with what the beam shape is making the verification of a uniform far field even more important.

Being able to fill the exit aperture 112 (FIG. 1B) without wasting laser diode 102 energy improves Class 1 performance close in. Moreover, the fact that the original source of the active region 104 has been re-imaged, the maximum allowable energy goes up. The laser diode 102 is considered a line source, so for eye-safety calculations the angular subtense of the laser diode 102 is the arithmetic mean of the width and alpha min. Alpha max, which is about 100 mRad need not be considered.

However, given a source that is circular, one gets the full 5 angular subtense allowance, meaning that almost 60% more energy can be output by having a uniform circular source instead of a line stripe which is a major improvement. Being able to fill the exit aperture is a significant feature with a 905 nm source but that just relates to an improvement in energy output.

In addition, the temporal profile of the laser pulse depends on the beam pattern along the central axis normal to the laser diode 102 and is usually very uniform. However when viewed on the axis in the plane of the laser diode 102 active region 104, the pulse shape becomes substantially non-uniform and varies in time quite a bit thereby degrading accuracy. For example, when aiming at a point with the left edge of the laser beam, a long target range can be determined if the reflected beam is late. Conversely, if looking at the other edge, the return can come in early resulting in a short target range. So, depending on where the return shapes come in, a variation in pulse travel time can be experienced leading to a concomitant variation in the instrument's accuracy.

It has been observed that positioning a diffuser over the exit aperture 112 creates a much more uniform pulse shape in any part of the beam by effectively integrating the temporal error in the laser pulse. However, this results in a very poorly defined far field which, while in certain short range applications like liquid level measurement may be acceptable, is inherently not acceptable for longer distance and speed measurement applications where a well-defined beam is essential.

In accordance with a technique of the present invention, the laser source is re-imaged through a controlled aperture in conjunction with an optical diffuser such that temporal integration of the beam is achieved resulting in a controlled far field pattern. With a uniform source, the energy output from the instrument can be increased while still remaining within Class 1 eye-safety limits. The diffuser may be a holographic diffuser (e.g. a narrow angle holographic diffuser) but need not be. Holographic diffusers have advantages from the standpoint of exhibiting a controlled divergence thereby conserving energy use. However, at 905 nm, there is already excess energy available so other types of diffusers may suffice.

Representative holographic diffusers include those available from Edmund Optics, Inc., Barrington, N.J. including those with between 20° to 30° diffusing angle circular diffusers and 5°×30° diffusing angle elliptical diffusers. When used in conjunction with an asymmetric re-imaging system, a circular diffuser would generally suffice. However, if the diffuser is mounted adjacent the laser diode 104 and allows the beam to diffuse to fill the circular aperture, then an elliptical diffuser is suggested as the 10 degree by 30 divergence of the asymmetrical beam 106 in the plane of, and normal to, the active region 104 respectively would suggest that a 5×30 degree elliptical diffuser would result in a 40 by 35 degree beam which is almost totally uniform. In like manner, an elliptical diffuser would be suggested if the diffuser is directly associated with (or proximate) the surface of the laser diode 102.

With a 905 nm laser diode 102, refocusing of the active area 104 (FIG. 1A) results in a stripe so an elliptical diffuser is suggested in conjunction with conventional symmetric lenses to off-set the narrow and steep divergence of the asymmetrical beam 106 (FIG. 1B) prior to the exit aperture 112.

1550 nm laser diodes 102 exhibit an asymmetrical beam 106 exit divergence that is even greater than those at 905 nm, on the order of 12° in the plane of the active element 104 and 40° orthogonal thereto. Moreover, 1550 nm laser diodes 102 are only about ⅓ as efficient as those at 905 nm with the Class 1 eye-safety limit being about 10 to 100 times greater depending upon how it is defined. Consequently, insufficient energy is provided by conventional 1550 nm laser diodes 102 to reach the Class 1 limit in addition to the fact that they are more expensive than those available at 905 nm. Eye-safe 1550 nm solid state emitters, as opposed to laser diodes 102, are used for tactical and military applications since conventional night vision equipment cannot detect the emitted light and a great deal of energy can be directed toward a target at great range.

With reference additionally now to FIG. 3, an additional simplified representation of a modified laser source 300 according to a further particular embodiment of the present invention is illustrated comprising a pair of opposing cylinder lenses 302, 304 for focusing the output of a laser diode 102 through a pinhole 306.

Each of the cylinder lenses 302, 304 provide image magnification in only a single axis and exhibit differing radii in their X and Y axes. Since laser diode 102 emits an elliptical shaped beam as discussed previously, the cylinder lenses 302, 302 in combination serve to effectively circularize the elliptical beam output of the laser diode 102 for focus through the pinhole 306, the combination providing a spatial filter. Again, in order to remain in compliance with Class 1 eye-safety limits, it should be noted that in conjunction with 905 nm laser diodes 102 a circular diffuser 204 is suggested in association with pinhole 306 while in conjunction with 1550 nm laser diodes 102 a diffuser 204 is not necessary. At 1550 nm, the laser source modification techniques of the present invention are operative to control the beam divergence angle such that it is now effectively made uniform to enable as much energy as possible to pass through the objective lens from the smallest source.

The combination of cylinder lenses 302 and 304 produce a uniform divergence of the laser light when reimaged. The cylinder lens 302 takes the 40° axis and focuses on the long distance thereby providing a 1 to 3 source to object ratio. In this manner, the angles come down but the output is a bit broader. However, this is acceptable as the input to the cylinder lens 302 began as a line stripe. The cylinder lens 304 than supplies the opposite conjugate of 3 to 1 which approximately corresponds to the difference in the divergence. In operation, cylinder lens 304 has increased the divergence but at ⅓ the size and the output of the cylinder lens 304 is approximately a point, meaning that the stripe, or active area 104, of the laser diode 102 has been reimaged into a much smaller exit aperture. In this manner, the approximately 200 micron stripe can be passed through a 100 micron spatial filter comprising pinhole 306.

Functionally, the resultant advantage of the arrangement shown in FIG. 3 is that 80% to 90% of the energy output of the laser diode 102 200 micron source is available through a 100 micron spatial filter with reasonable exit divergence of on the order of 30 degrees F./2 exit divergence. As mentioned previously, this is particularly important with 1550 nm laser diodes 102 as it is not possible to emit sufficient energy to reach Class 1 eye-safety limits.

Through the arrangement of cylinder lenses 302, 304 and pinhole 306 the laser source is optimized with respect to the object and the 1550 nm source is effectively reimaged to trade off width for height in the asymmetric beam 106. This results in a smaller, effective circle of energy from the reimaged source which allows for the painting of more energy on a remote target for a given transmit lens aperture.

The same technique can also be applied to a 905 nm laser diode 102 source as well inasmuch as a better defined source can be achieved and used in conjunction with a stronger, or wider angle diffuser 204. With a wider angle diffuser 204, the exit aperture 112 can definitely be over-filled and still exhibit a substantially well-controlled image, in effect coupling the stripe or the active area 104 into a circle.

In essence, the techniques of the present invention allow for the provision of more energy through a circular exit aperture 112 than the width of the source enabling more energy to be painted on a target for a given lens size. This then results in being able, at 1550 nm, to control the energy to achieve the maximum energy output into the smallest aperture size by reimaging the source. This technique can also be employed in conjunction with a diffuser 204 to enhance beam quality and enhance the temporal quality of the pulses emitted. With 1550 nm laser diodes 204, accuracy of the instrument is generally not paramount and the desire is to achieve the maximum possible range. Consequently at 1550 nm, reimaging of the asymmetrical beam is a significant enhancement.

With 905 nm sources, a diffuser 204 can be employed to effectuate reimaging of the source. Nevertheless, it should be noted that the technique previously described with respect to 1550 nm sources can be used in conjunction with a diffuser 204 to increase the efficiency of the diffuser 204.

Figure 4:
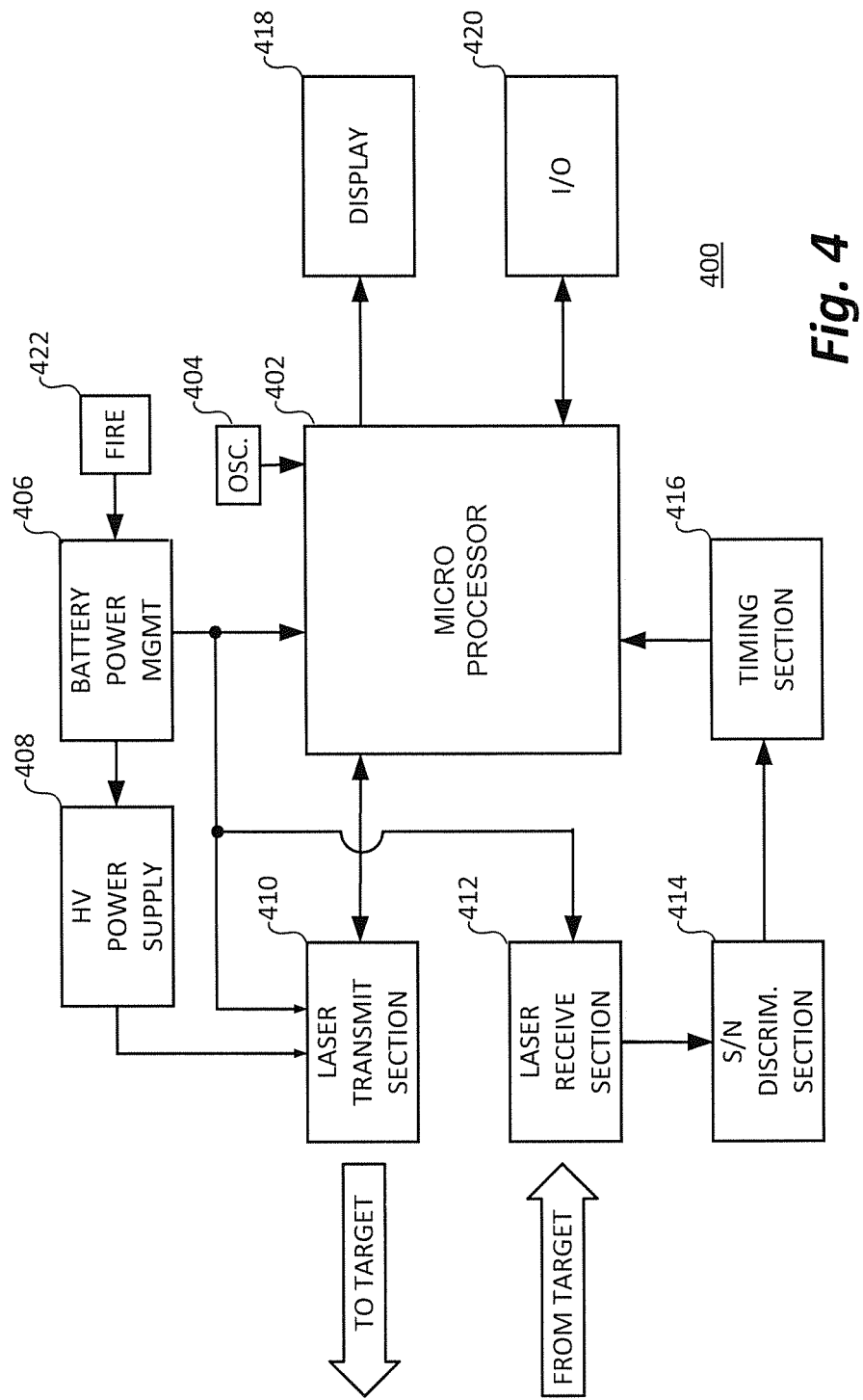
FIG. 4 is a representative functional block diagram of a laser rangefinding and speed measurement instrument for possible incorporation of the laser source modification techniques of the present invention.

With reference additionally now to FIG. 4, a representative functional block diagram of a laser rangefinding and speed measurement instrument 400 is shown for possible incorporation of the laser source modification techniques of the present invention.

The exemplary instrument 400 comprises a microprocessor 402 or central processing unit (CPU) with an associated oscillator 404 for providing clocking signals to the microprocessor 402. A battery and power management section 406 supplies operating power to the microprocessor 402 and various other instrument subsystems (not shown) as well as the high voltage (HV) power supply 408 which provides operating voltage to a laser transmit section 410 and associated laser diode as well as a laser receive section 412 and associated photodiode.

The laser receive section 412 receives a portion of the laser energy transmitted by the laser transmit section 410 as reflected by a target through a photodiode and provides the return signals to a signal/noise (S/N) discriminator section 414 in order to separate true return pulses from any associated noise. A timing section 416 accurately measures the time between the transmission of laser pulses from the laser transmit section 410 and the reception of the same target reflected pulses at the laser receive section 412 to determine, in conjunction with the microprocessor 402, the distance to the particular target towards which the instrument 400 is aimed. A fire button 422 is coupled to the battery and power management section 406 and is operable by a user of the instrument 400 in conjunction with the microprocessor 402 to determine when to emit pulses toward a target from the laser transmit section 410.

The instrument 400 may also incorporate a user viewable display 418, which may include a view of the target in conjunction with an aiming reticule as well as information regarding the range to the target, speed of the target, battery condition and other information. The display 418 may also comprise a touchscreen display to allow user inputs to the instrument 400 in conjunction with, or as an alternative to, an input/output (I/O) section 420.

The I/O section 420 may comprise a keypad or other means of communicating information to or from the microprocessor 402 including wired connections such as a universal serial bus (USB) and the like as well as wireless connections such as an IEEE 802.11 (WiFi), or other wireless local area network (WLAN) transceiver; a Bluetooth transceiver or other personal area network (PAN) system for wirelessly exchanging data over short distances; and/or another near field communication (NFC) transceiver (inclusive of infrared (IR) coupling) for wirelessly coupling the instrument 400 to external devices or data storage elements.

While there have been described above the principles of the present invention in conjunction with specific optical structures and arrangements, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A rangefinding or speed measurement instrument having an eye-safe laser light transmission section comprising:
   a laser diode emitting an asymmetric beam pattern;
   an exit aperture for directing laser energy from said laser diode toward a target;
   a diffuser interposed between said laser diode and said exit aperture;
   a spatial filter associated with said diffuser; and
   a collimating lens interposed between said diffuser and said exit aperture,
   wherein said laser diode comprises a 905 nm pulsed laser diode.

2. A rangefinding or speed measurement instrument having an eye-safe laser light transmission section comprising:
   a laser diode emitting an asymmetric beam pattern;
   an exit aperture for directing laser energy from said laser diode toward a target;
   a diffuser interposed between said laser diode and said exit aperture;
   a spatial filter associated with said diffuser; and
   a collimating lens interposed between said diffuser and said exit aperture,
   wherein said laser diode comprises a 905 nm pulsed laser diode and said diffuser comprises one of an elliptical, holographic or wide angle holographic diffuser and said diffuser is operative to overfill said exit aperture with said laser energy.

3. A rangefinding or speed measurement instrument having an eye-safe laser light transmission section comprising:
- a laser diode emitting an asymmetric beam pattern;
- an exit aperture for directing said laser light from said laser diode toward a target;
- an elliptical diffuser interposed between said laser diode and said exit aperture;
- a spatial filter associated with said elliptical diffuser; and
- a collimating lens interposed between said diffuser and said exit aperture,
- wherein said laser diode comprises a 905 nm pulsed laser diode and said elliptical diffuser is operative to overfill has exit aperture.

4. A rangefinding or speed measurement instrument having an eye-safe laser light transmission section comprising:
- a laser diode emitting an asymmetric beam pattern;
- an exit aperture for directing said laser light from said laser diode toward a target;
- an elliptical diffuser interposed between said laser diode and said exit aperture;
- a spatial filter associated with said elliptical diffuser; and
- a collimating lens interposed between said diffuser and said exit aperture,
- wherein said laser diode comprises a 905 nm pulsed laser diode and said elliptical diffuser is one of a holographic or wide angle diffuser and is operative to overfill has exit aperture.

* * * * *